(12) United States Patent
Matter et al.

(10) Patent No.: US 12,539,271 B2
(45) Date of Patent: Feb. 3, 2026

(54) NANOPARTICULATE COMPOSITIONS (71) Applicants: EMPA EIDGENÖSSISCHE MATERIALPRÜFUNGS- UND FORSCHUNGSANSTALT, Dübendorf (CH); ETH Zurich, Zürich (CH)

(72) Inventors: Tino Matter, Dübendorf (CH); Inge Herrmann, Dübendorf (CH)

(73) Assignees: EMPA EIDGENÖSSISCHE MATERIALPRÜFUNGS-UND FORSCHUNGSANSTALT, Dübendorf (CH); ETH Zurich, Zurich (CH)

(*) Notice: Subject to any disclaimer, the term of this patent is extended or adjusted under 35 U.S.C. 154(b) by 301 days.

(21) Appl. No.: 18/286,914

(22) PCT Filed: Apr. 14, 2022

(86) PCT No.: PCT/EP2022/060076
§ 371 (c)(1),
(2) Date: Oct. 13, 2023

(87) PCT Pub. No.: WO2022/219139
PCT Pub. Date: Oct. 20, 2022

(65) Prior Publication Data
US 2024/0216267 A1 Jul. 4, 2024

(30) Foreign Application Priority Data
Apr. 15, 2021 (EP) .................. 21168502

(51) Int. Cl.
| | |
|---|---|
| *A61K 33/08* | (2006.01) |
| *A61K 9/00* | (2006.01) |
| *A61K 9/14* | (2006.01) |
| *A61K 33/30* | (2006.01) |
| *A61K 33/32* | (2006.01) |
| *A61K 33/38* | (2006.01) |
| *A61K 33/42* | (2006.01) |
| *A61P 17/02* | (2006.01) |
| *A61P 31/04* | (2006.01) |
| *B82Y 5/00* | (2011.01) |

(52) U.S. Cl.
CPC ............ *A61K 9/0014* (2013.01); *A61K 9/145* (2013.01); *A61K 33/08* (2013.01); *A61K 33/30* (2013.01); *A61K 33/32* (2013.01); *A61K 33/38* (2013.01); *A61K 33/42* (2013.01); *A61P 17/02* (2018.01); *A61P 31/04* (2018.01); *B82Y 5/00* (2013.01)

(58) Field of Classification Search
CPC ..................................................... A61K 33/00
See application file for complete search history.

(56) References Cited

FOREIGN PATENT DOCUMENTS

WO 2015/036410 A1 3/2015

OTHER PUBLICATIONS

Ioana Lese, et al., "Bioactive nanoparticle-based formulations increase survival area of perforator flaps in a rat model", PLOS One, Nov. 26, 2018 vol. 13, No. 11, e0207802 (19 pages).
Matter, et al., "Developing a tissue glue by engineering the adhesive and hemostatic properties of metal oxide nanoparticles", Nanoscale, vol. 9, 2017, pp. 8418-8426 (9 pages).
Lese Ioana et al., "Nanoparticles: a novel treatment modality to reduce seroma formation", Euraps European Association of Plastic Surgeons, May 23, 2019, pp. 57.
Martin T. Matter, et al., "Engineering the Bioactivity of Flame-Made Ceria and Ceria/Bioglass Hybrid Nanoparticles", Applied Materials & Interfaces, Dec. 20, 2018, vol. 11, No. 3, pp. 2830-2839.
Carl Walkey, et al., "Catalytic properties and biomedical applications of cerium oxide nanoparticles", The Royal Society of Chemistry, Environmental Science: Nano, Jan. 1, 2015, vol. 2, No. 1, pp. 33-53.
International Search Report for PCT/EP2022/060076 dated Jul. 25, 2022.
Written Opinion for PCT/EP2022/060076 dated Jul. 25, 2022.

*Primary Examiner* — Sarah Alawadi
(74) *Attorney, Agent, or Firm* — Sughrue Mion, PLLC (57) ABSTRACT

Suspensions containing oxidic nanoparticles as a dispersed phase and an aqueous solution containing citric acid as a diluent are disclosed. Advantageously, the oxidic nanoparticles contain bioglass and ceria. Also further disclosed are topical dosage forms including such oxidic nanoparticles and uses thereof. The dosage forms were found to be useful in the treatment of wounds and post-operative lesions, and particularly for the prevention of seroma, the prevention of infections and/or the prevention of inflammation.

16 Claims, 7 Drawing Sheets

NANOPARTICULATE COMPOSITIONS

CROSS REFERENCE TO RELATED APPLICATIONS

This application is a National Stage of International Application No. PCT/EP2022/060076 filed Apr. 14, 2022, claiming priority based on European Patent Application No. 21168502.9 filed Apr. 15, 2021.

The present invention relates to suspensions comprising oxidic nanoparticles as dispersed phase and an aqueous solution comprising citric acid as diluent, to topical dosage forms comprising such oxidic nanoparticles and to the use thereof. The dosage forms were found to be useful in the treatment of wounds and post-operative lesions, particularly the prevention of seroma, the prevention of infections and/or the prevention of inflammation.

Wound infections are a common complication in both wound care and surgery, often leading to life-threatening conditions, amputations and prolonged hospital stays. Treatment of wound infections has become even more challenging due to the increase of antibiotic resistance among microorganisms, including the rise of multidrug-resistant organisms (MDROs). Thus, treatment options that have been successfully used for decades have now been rendered less efficient in many cases and are sometimes even considered non-efficient at all. As a consequence, many wound care experts nowadays advice against the routine prophylactic use of antibiotics in skin wound care and only encourage its use for wounds that are at high risk of antimicrobial infection. In order to prevent antibiotic resistance, the type of microorganisms causing the wound infection have to be investigated before a specific antibiotic, either topically or systemically, can be used. These measurements take time, thus exposing the patient to a prolonged risk.

Although less resistances have been reported for topical antiseptics, such as polyvidone-iodine or cetrimide, such antiseptics are only advised for the sterilisation of superficial wound environments. Their use in the treatment of wound infections is discouraged due to toxicity concerns.

Recently, nanomaterials have gained attention for applications in the wound-management/infection-management field due to their high effectivity, ease of production and the prospect of being less vulnerable to bacterial resistance mechanisms.

Nevertheless, an efficient antimicrobial composition that does not raise toxicity concerns still needs to be found.

In addition, seroma formation is a common yet poorly understood postoperative complication caused by the accumulation of serous fluid following the dissection of extensive cutaneous flaps. Therapeutic management of seromas is difficult and typically requires drainage and is associated with wound healing problems, thereby leading to prolonged hospital stays. Although the exact pathogenesis of seroma formation is still under debate, seromas are generally considered to be formed by accumulating lymphatic and serous fluid. However, several studies have also suggested surgical trauma and the resulting acute inflammatory exudation as a cause of seroma formation. However, despite various efforts to use tissue adhesives and anti-inflammatory substances such as methyl-prednisolone to reduce postoperative seroma formation, no clinically successful method has yet been developed.

WO2015036410 generally describes a composition of nanoparticles for its medical or surgical use as gluing agent or adhesive. Although the described nanoparticles (NPs) may be used in a method for sealing a tissue defect and providing a barrier to microbial infections, no anti-microbial properties of the NPs per se are described. Instead it is suggested that in one embodiment, before gluing, the surfaces [that are intended to be glued together] can be treated specifically by anti-microbial compounds, cationic compounds, depending on the pH and pKa of the nanoparticles composition, so that nanoparticles can be adsorbed. Further, although several possible components of the nanoparticles are suggested, neither inclusion of Sr nor Ag is mentioned. Moreover, of citric acid and/or addition a pharmaceutically acceptable salt thereof to the composition of nanoparticles is not described.

Matter et al. 2017 [Nanoscale 2017, 9:8418-8426] report on the synthesis of several metal oxide NPs, including bioglass, cerium oxide (ceria, $CeO_2$) and cerium oxide/bioglass hybrids, by liquid-feed flame spray pyrolysis (LF-FSP), and their investigation as so-called "bioactive tissue adhesives" for wound-management applications. The report focusses on tissue adhesive and hemostatic properties of the metal oxide NPs. However, antimicrobial properties are not discussed and no doping of NPs is described. For example, the reported bioglass NPs are composed of 53% $SiO_2$, 4% $P_2O_5$, 18% CaO and 25% $Na_2O$ as measured by inductively coupled plasma optical emission spectrometry (ICP-OES), thereby approximately matching the theoretical composition of pure bioglass. Furthermore, no additives, such as stabilizing agents, are added to the nanoparticulate composition described in that document. In fact, it is explicitly stated that hydrodynamic diameters as measured by dynamic light scattering (DLS) showed high variation in water.

Matter et al. 2019 [ACS Appl. Mater. Interfaces 2019, 11: 2830-2839] follows up on the above document and describes the synthesis of pure cerium oxide NPs and ceria/bioglass hybrid nanoparticles by LF-FSP. The document further discusses antimicrobial properties of the NPs and their use in the support of wound healing. However, the document only describes pure cerium oxide NPs or hybrid nanoparticles consisting of pure ceria and bioglass, i.e. no doping of either component is described. Again, no additives, such as stabilizing agents, are included in the nanoparticulate composition described in that document.

Lese et al. 2018 [PLoS ONE 13 (11): e0207802] describes the use of three different nanoparticulate compositions for the prevention of distal flap necrosis of perforator flaps, said nanoparticulate compositions comprising either pure bioglass NPs, or pure bioglass/ceria hybrid NPs, or Zinc-doped strontium-substituted bioglass/ceria hybrid NPs. The report suggests an anti-inflammatory and neo-angiogenic effect of the investigated NPs, thereby increasing blood supply and promoting flap survival. However, the document neither describes antimicrobial properties of the NPs nor does it suggest the use of citric acid and/or a pharmaceutically acceptable salt thereof as part of the nanoparticulate composition. Moreover, despite doping of the bioglass with Zn and Sr is described, no inclusion of Ag and/or Zr is mentioned.

Lese et al. 2019 [abstract book p.57, European Association of Plastic Surgeons Meeting on 23-25 May 2019] describes that Zn-doped Sr-substituted bioglass/ceria nanoparticles have the potential to reduce seroma formation. Again, although doping of the bioglass with Zn and Sr is described, neither inclusion of Ag and/or Zr in the NPs nor inclusion of citric acid and/or a pharmaceutically acceptable salt thereof as part of the nanoparticulate composition is mentioned. Moreover, the report focusses on the gluing properties of the nanoparticulate composition (also referred to as nanobridging) but is silent on antimicrobial properties.

Walkey et al [NANO 2019, vol.2, no.1, p. 33-53] review catalytic properties and biomedical application of nanoceria. The document raises questions about what further study is needed to apply nanoceria in biomedical applications. The authors conclude in that many questions still remain, among others, as to the natural protein corona that builds on nanoceria in vivo. The document does not disclose or suggest the presene of bioglass nanoparticles.

In consequence, there is an unmet clinical need for providing compositions to effectively treat wounds and/or surgical lesions.

These objectives are achieved by a topical dosage form as defined in claim 1 and the therapeutic applications as defined in claim 11. Further aspects of the invention are disclosed in the specification and independent claims, preferred embodiments are disclosed in the specification and the dependent claims.

The present invention will be described in more detail below. It is understood that the various embodiments, preferences and ranges as provided/disclosed in this specification may be combined at will. Further, depending of the specific embodiment, selected definitions, embodiments or ranges may not apply.

Unless otherwise stated, the following definitions shall apply in this specification:

As used herein, the term "a", "an", "the" and similar terms used in the context of the present invention (especially in the context of the claims) are to be construed to cover both the singular and plural unless otherwise indicated herein or clearly contradicted by the context. As used herein, the terms "including", "containing" and "comprising" are used herein in their open, non-limiting sense.

The terms "treating", "treat" and "treatment" include one or more of the following: (i) preventing a disease, pathologic or medical condition from occurring (e.g. prophylaxis); (ii) inhibiting the disease, pathologic or medical condition or arresting its development; (iii) relieving the disease, pathologic or medical condition; (iv) diminishing symptoms associated with the disease, pathologic or medical condition. Thus, the terms "treat", "treatment", and "treating" extend to prophylaxis and include prevent, prevention, preventing, lowering, stopping or reversing the progression or severity of the condition or symptoms being treated. As such, the term "treatment" includes medical, therapeutic, and/or prophylactic administration, as appropriate.

As used herein, the term "topical treatment" relates to the application of a dosage form on a particular place on or in the body. Thus, a topical treatment aims at achieving a local effect essentially limited to, or limited to, the application area. It is thus understood that a topical treatment differs from any treatment method that aims at achieving a systemic effect, such as intravenous application or the application of transdermal therapeutic systems (TTS). However, the skilled person will understand that, although not desired, minor systemic effects may also result from such topical treatments.

The present invention will be better understood by reference to the figures.

BRIEF DESCRIPTION OF THE DRAWINGS

Fig. 1A and FIG. 1B illustrate the oxidic nanoparticles according to this invention FIG. 1A: schematically indicates elemental composition of the particles described herein
 #2: bioglass nanoparticle composition ("BG")
 #3: silver-doped bioglass nanoparticle composition ("Ag2BG")
 #1: cerium oxide nanoparticle composition ("Ceria")
 #4: nanoparticle comprising ceria and bioglass ("BG/Ceria")
 #5: nanoparticle comprising ceria and bioglass, whereby the bioglass is Zn-doped and the Ca is partly substituted by Sr. ("Zn2SrBG/ceria")

The numbers in brackets illustrate the theoretical ("t") and the measured ("m") oxide composition of the different compositions:
 #1
  (1) $CeO_2$; t: 100
 #2
  (1) $SiO_2$; m: 44.91; t: 45
  (2) $P_2O_5$; m: 6.34; t: 6
  (3) CaO; m: 24.09; t: 24.5
  (4) $Na_2O$; m: 24.66; t: 24.5
 #3
  (1) $SiO_2$; m: 44.24; t: 44.1
  (2) Ag; m: 2.04; t: 2
  (3) $P_2O_5$; m: 6.26; t: 5.88
  (4) CaO; m: 24.38; t: 24.01
  (5) $Na_2O$; m: 23.02; t: 24.01
 #4
  (1) $SiO_2$; m: 22.12; t: 22.5
  (2) $P_2O_5$; m: 3.3; t: 3
  (3) CaO; m: 12.73; t: 12.25
  (4) $Na_2O$; m: 11.29; t: 12.25
  (5) $CeO_2$; m: 50.52; t: 50
 #5
  (1) $SiO_2$; m: 22.2; t: 22.17
  (2) $P_2O_5$; m: 2.59; t: 2.67
  (3) CaO; m: 6.1; t: 5.79
  (4) $Na_2O$; m: 11.25; t: 11.92
  (5) $CeO_2$; m: 49.85; t: 49.67
  (6) SrO; m: 6.19; t: 5.79
  (7) Zn; m: 1.81; t: 2

FIG. 1B: schematically indicates various embodiments of a first and a second phase:
 (i) core—shell type nanoparticle [both (11)@(12) and (12)@(11)]
 (ii) janus—type nanoparticle
 (iii) mixed phase nanoparticle
 (iv) phase segregated nanoparticle.

FIG. 2A shows the stability of the nanoparticle #5 in suspension (1 mg/mL) and FIG. 2B shows the stability of nanoparticle #2 in suspension.
y-axis: hydrodynamic diameter (nm measured by DLS),
x-axis: minutes after preparation of suspension (min).
top (comparison): diluent=Ringer's solution,
bottom (inventive): diluent=Ringer's solution+1.5 mM citric acid+3 mM sodium citrate.

FIG. 3 shows size distribution of nanoparticle #5 in suspension. (1 mg/mL)
y-axis: polydispersity index (measured by DLS),
x-axis: minutes after preparation of suspension (min).
top (comparison): diluent=Ringer's solution,
bottom (inventive): diluent=Ringer's solution+1.5 mM citric acid+3 mM sodium citrate FIG. 4 shows H2O2 concentration over time;
Y-Axis: concentration H2O2 (measured @230 nm),
X-Axis: time (hrs).
top (control);
middle (comparison) Ringer's solution, not citric acid; bottom (inventive) Ringer's solution+1.5
mM citric acid+3 mM sodium citrate.

FIG. 7 shows

FIG. 7A, y-axis: MRSA growth (%))
FIG. 7B, y-axis: Macrophage toxicity (%)
From left to right: PBS-TritonX-Gentamicin-#2-#1-#4-#5.

FIG. 7C: inhibition of the nanoparticle internalization by blocking of the actin polymerization with cytoD leads to suppression of the antimicrobial activity.
y-axis: MRSA growth (%)
From left to right: PBS-Gentamicin-#5.

FIG. 7D: No macrophage toxicity was observed for any of the treatments (in absence of MRSA).
Control PBS was set as 100% growth and 0% toxicity. Significance levels compared to PBS are shown, $p<0.0001$. N=3.
y-axis: Macrophage toxicity (%)
From left to right: PBS-TritonX-Gentamicin-#5.

FIG. 8A: Seroma healing rate. Seromas treated nanoparticle #5 had a 100% healing rate, whereas the fibrin sealant only helped 50% to heal. Utilizing only aspiration, which is the current standard of care, around 30% of the seromas healed.
y-axis: seroma reoccurrence reduction (%),
from left to right: current standard of care-fibrin sealant-#5.

FIG. 8B: Seroma volume. The nanoparticle #5 treated rats had no seroma volume at all while the other two groups showed similar volumes on average.
y-axis: seroma volume (ml),
from left to right: current standard of care-fibrin sealant-#5.

In more general terms, in a first aspect, the invention relates to a suspension, particularly a topical dosage form, comprising a dispersed phase (1) and diluent (2), wherein the dispersed phase comprises a plurality of oxidic nanoparticles as defined below and the diluent comprises water and citric acid, and whereby the ratio oxidic nanoparticles: citric acid is between 0.1-100:1 (wt/wt). It was found that these suspensions have beneficial therapeutic properties, they are particularly suited as topical dosage form to prevent formation of seroma, to prevent microbial infection and/or to prevent inflammation. This aspect of the invention shall be explained in further detail below:

Dispersed phase (1)/Nanoparticles:
Dispersed phase: The dispersed phase comprises, preferably consists of, nanoparticles as described herein.

Chemical composition: As indicated above, the nanoparticles are oxidic, ie. they comprise oxygen as anions. The corresponding cations are the metals cited herein, Phosphorous and Silica. The term oxidic is understood to include phosphate moieties and silicate moieties, such as $PO_4^{3-}$, $SiO_4^{4-}$, $Si_2O_7^{6-}$ and the like. Further, oxidic nanoparticles may contain minor amounts of carbonates and/or nitrates. Typically, the amount of such moieties is below 1 atom %.

The oxidic nanoparticles are characterized by its elemental composition, as measured by OES, e.g. ICP-OES.

In one embodiment, the dispersed phase (1) of the inventive composition comprises, particularly consists of, bioactive glass. Accordingly, the nanoparticles may comprise up to 100 wt % bioactive glass. This embodiment includes chemical compositions of nanoparticles as described below, c.f. section "bioglass".

In a preferred embodiment, the dispersed phase (1) of the inventive composition comprises, particularly consists of, a combination of both, bioactive glass and ceria. Accordingly, the nanoparticles, when considering the chemical composition of the bulk material, may comprise less than 100 wt % bioglass and more than 0 wt % ceria. In an advantageous embodiment, the dispersed phase comprises at least 10 wt %, such as 80-30 wt % bioglass and up to 90 wt %, such as 20-70 wt % ceria.

In embodiments, the nanoparticles comprise:
10-50 wt % Si, when calculated as $SiO_2$.
0-30 wt % Ca and/or Sr, when calculated as Cao and/or SrO.
5-30 wt % Na, when calculated as $Na_2O$.
up to 10 wt % P, when calculated as $P_2O_5$.
up to 10 wt % Zn, when calculated as ZnO.
10-90 wt % Ce, when calculated as $CeO_2$.
up to 10 wt % Ag, when calculated as Ag.
up to 50 wt % Zr, when calculated as $ZrO_2$
up to 90 wt % Mn, when calculated as $MnO_2$.

In advantageous embodiments, the nanoparticles comprise:
15-40 wt % Si, when calculated as $SiO_2$.
1-15 wt % Ca, when calculated as CaO.
up to 15 wt % Sr, when calculated as SrO.
5-20 wt % Na, when calculated as $Na_2O$.
1-5 wt % P, when calculated as $P_2O_5$.
up to 5 wt % Zn, when calculated as ZnO.
20-70 wt % Ce, when calculated as $CeO_2$.
up to 5 wt % Ag, when calculated as Ag.
up to 30 wt % Zr, when calculated as $ZrO_2$
up to 50wt % Mn, when calculated as $MnO_2$.

In particular advantageous embodiments, the nanoparticles comprise:
15-25 wt % Si, when calculated as $SiO_2$.
5-12 wt % Ca, when calculated as CaO.
up to 10 wt % Sr, when calculated as SrO.
10-15 wt % Na, when calculated as $Na_2O$.
1.5-3 wt % P, when calculated as $P_2O_5$.
up to 3 wt % Zn, when calculated as ZnO.
45-55 wt % Ce, when calculated as $CeO_2$.
up to 3 wt % Ag, when calculated as Ag.
up to 20 wt % Zr, when calculated as $ZrO_2$
up to 25 wt % Mn, when calculated as $MnO_2$.

In embodiments, the nanoparticles are free of P.
In embodiments, the nanoparticles are free of Sr.
In embodiments, the nanoparticles are free of Zn.
In embodiments, the nanoparticles are free of Ag.
In embodiments, the nanoparticles are free of Zr.
In embodiments, the nanoparticles are free of Mn.
In embodiments, the nanoparticles are free of Ce.

The elemental composition, as defined herein, is determined on the bulk material. Accordingly, on a nanoscale, individual Ceria particles and individual bioglass particles may be present, the bulk material (e.g. 1 g oxidic nanoparticles) comply with the elemental composition described above.

As outlined in further detail below, the oxidic nanoparticles comprise one or more phase (s), preferably two spatially separated phases (11, 12).

Size: The size of the nanoparticles may vary over a broad range, the size being determined by routine methods, e.g. dynamic light scattering (DLS), BET or TEM. Suitable ranges for nanoparticle size are given below, depending on the method of size determination.

Hydrodynamic diameter, DLS: Suitable are nanoparticles (1) having a hydrodynamic diameter $d_{DLS}$ of 10-2000 nm, preferably 10-200 nm such as 40-120 nm, as measured by DLS.

Advantageously, the nanoparticles have a narrow size distribution, as indicated by a low polydispersity index. Suitable are nanoparticles (1) having an index below 0.5, preferably below 0.4, such as below 0.3, as measured by DLS. Both, small particle size and narrow size distribution indicate low agglomeration of nanoparticles. Without being bound to theory, it is believed that the presence of citric acid in the inventive suspensions ensures these beneficial properties.

TEM: Determining the particle size by electron microscopy $d_{TEM}$, a typical range is 4-40 nm, such as 5-10 nm. Without being bound to theory, it is believed that these different values between $d_{TEM}$ and $d_{DLS}$ originate from partial agglomeration as well as overestimation of the average hydrodynamic size of nanoparticles forming fractal agglomerates by DLS.

BET: Determining the particle size by Gas adsorption according to BET theory, $d_{BET}$, a typical range is 3-20 nm, such as 10 nm. Without being bound to theory, it is believed that these different values between $d_{BET}$ and $d_{DLS}$ originate from agglomeration of nanoparticles in aqueous suspensions.

Figure 1A:
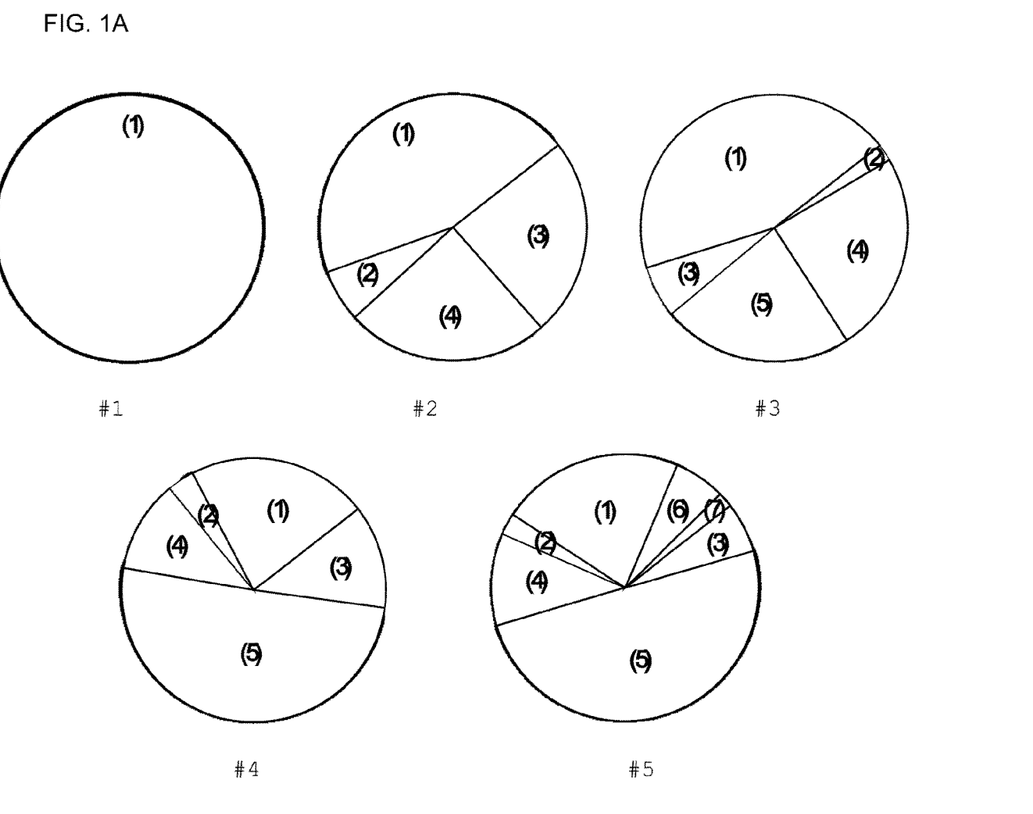
Figure 1B:
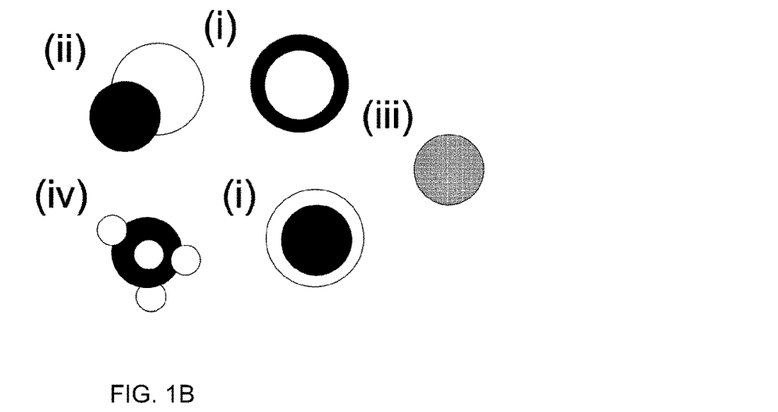

Structure: The nanoparticles have various architectures themselves and combine properties on the nanoscale. The architectures are schematically illustrated in FIG. 1B.

In one embodiment, they consist of one single phase only.

Typically, they consist of multiple metal-oxide phases (11, 12, 1n) including amorphous and crystalline phases (e.g. bioglass and ceria). These phases may be present in different arrangements (pure, core-shell, janus types, mixed phases). These arrangements represent idealized forms. In the suspensions and dosage forms described herein, these arrangements may be present individually or in combination.

In one embodiment, only pure nanoparticles may be present in a suspension or dosage form according to this invention.

In other embodiments, a mixture of nanoparticles of these different arrangements may be present in a dosage form according to this invention. Such mixture of nanoparticles may comprise pure bioglass-nanoparticles and pure ceria-nanoparticles and mixed-phase nanoparticles comprising both, bioglass and ceria.

Additionally, the nanoparticles may contain dopant ions dispersed in their main materials. This situation is visualized in FIG. 1B. The structure of nanoparticles may be determined by electron microscopy and powder XRD.

Accordingly, the invention provides for a suspension wherein a first group of oxidic material and a second group of oxidic material are present as separate nanoparticular entities and/or are present as combined nanoparticular entities (including core-shell particles (i) and janus-type particles (ii) or mixed phases (iii) or (iv)).

In embodiments, the first phase (11) is an amorphous phase (11). Such phase predominantly containing oxides of Si, Ca, Na, P and optionally Sr and/or Zn as determined by powder XRD.

In embodiments, the second phase is a crystalline phase (12). Such phase predominantly containing Ceria and optionally Ag or Zr as determined by powder XRD.

In embodiments, the first phase (11) is an amorphous phase of the bioactive glass type ("bioglass"). Bioglass is a known material. Briefly, the term is used herein to describe a group of surface reactive, glass-ceramic containing biomaterials and include the original bioactive glass, Bioglass 45S5, but also bioactive glass 42S5, S53P4, 55S4, 58S, 70S30C, 45S5F, 40S5B5 and others. As described in further detail below, the term bioactive glass includes $SiO_2$ containing glass-ceramic materials which further comprise Cao and/or Sro. Thus, in the context of this invention, Ca of the bioactive glass may be replaced partly or in full by Sr.

A suitable bioglass comprises
Silica, 20-60 wt %;
calcium oxide, 10-50 wt %, but no strontium oxide;
sodium oxide, 5-50 wt %;
phosphorus oxide, 0-20 wt %, and wherein each of the wt % is calculated as discussed above.

A further suitable bioglass comprises
Silica, 20-60 wt %;
a combination of calcium oxide and strontium oxide, 10-50 wt %;
sodium oxide, 5-50 wt %;
phosphorus oxide, 0-20 wt % and wherein each of the wt % is calculated as discussed above.

A further suitable bioglass comprises
Silica, 20-60 wt %;
strontium oxide, 10-50 wt %, but no calcium oxide;
sodium oxide, 5-50 wt %;
phosphor oxide, 0-20 wt %, and wherein each of the wt % is calculated as discussed above.

As conventional in the field, the bioactive glass may contain dopants. Preferred dopants are selected from the group consisting of Ag, Cu, Ga, Co and Zn. Particularly preferred dopant is Zn.

In embodiments, the second phase (12) is ceria, preferably selected from compounds of formula (I)

$$CeO_{2-x} \quad (I)$$

wherein x is between 0 and 0.67; and wherein up to 10 wt % of Ce may be replaced by a dopant. Preferred dopants are selected from the group consisting of Zr, Zn, Cu, Ag and Ga. Particularly preferred dopants are selected from the group consisting of Zr and Ag.

In one embodiment, said ceria is stoichiometric cer (IV) oxide; x=0. It may be crystalline or amorphous, preferably crystalline. In one embodiment, said ceria is nonstoichiometric cer (IV) oxide; 0.2≥x>0. It may be crystalline (with crystal defects) or amorphous, preferably crystalline.

In one embodiment, said ceria is stoichiometric cer (II, III) oxide [Ce3O4]; x=0.67 It may be crystalline or amorphous, preferably crystalline.

In one embodiment, said ceria (stoichiometric or non-stoichiometric) may contain dopants ("ceria-dopants"). Suitable dopants are known in the field and include Zr, Zn, Cu, Ag and Ga, preferably Zr. Such Ceria-dopants may be present in metallic and/or oxidic form. The amount of Ceria-dopant may vary over a broad range, typically below 10 wt %.

As indicated by formula (I), stoichiometric and non-stochiometric ceria is covered. This also includes surface defects which are observed for nanoparticulate material, particularly when obtained by an FSP process.

In embodiments, the oxidic nanoparticles (1) are a combination of pure nanoparticles and mixed-phase nanoparticles. The proportion of pure ceria nanoparticles, pure bioglas nanoparticles and mixed-phase bioglas-ceria nanoparticles may vary. Such combination of nanoparticles may have the following elemental composition, as measured by AES:

15-25 wt % Si, when calculated as $SiO_2$
5-10 wt % Ca when calculated as CaO
5-10 wt % Sr, when calculated as SrO
10-15 wt % Na, when calculated as Na2O
1.5-3 wt % P, when calculated as P2O5
1-3 wt % Zn, when calculated as ZnO, and
45-55 wt % Ce, when calculated as CeO2.

Diluent (2):

The diluent comprises (2) water, citric acid as defined herein, and optionally further pharmaceutically acceptable additives. Advantageously, the diluent is a homogeneous aqueous phase, ie. all constituents are present in dissolved form.

Citric acid: As discussed above, component (2) is an aqueous solution comprising citric acid. The amount of citric acid may vary over a broad range, its concentration is adapted to the amount of nanoparticles (1) being present. Suitably, the ratio oxidic nanoparticles: citric acid is 0.1-100, advantageously 1-10, particularly advantageously 1-4 (wt/wt, if calculated with anhydrous citric acid). Accordingly, the concentration of citric acid varies from 0.5-1000 mg/ml diluent.

Citric acid is a known compound; as used herein it refers to both isomers, citric acid (CAS 77-92-9) and isocitric acid (CAS 320-77-4). The term shall further include stereoisomers and mixtures thereof, i.e. diastereomes and enantiomers. The term shall include the anhydrous derivatives as well as hydrates thereof. The term shall also include salts thereof, particularly pharmaceutically acceptable salts. Further, depending on the further constituents of the inventive suspension, citric acid may be present dissolved in protonated form ($H_3A$), as mono-, di- and/or tri-anion ($H_2A^-$, $HA^{2-}$, $A^{3-}$).

In embodiments, a combination of citric acid and a pharmaceutically acceptable salt are added to the inventive suspension. Suitable are citrate buffers. Suitable are also phosphate-citrate-buffers. Such buffers are known in the field and are available as commercial items. Preferred are citric acid CAS 77-92-9, and its sodium salt CAS 68-04-2; suitably in the range of 10:1 to 1:10, advantageously 3:1 to 1:3, such as 1:1 to 1:2 (n/n).

additives: Pharmaceutically acceptable additives, particularly for topical administration, are known in the field. Such additives may be included to facilitate handling, to ensure or improve its performance and/or to avoid distribution within the body. Suitable additives, if present, may be selected from the group of rheology modifying agents, osmolarity modifying agents and pH modifying agents. The skilled person is in a position to choose additives for obtaining a physiological acceptable solution.

Osmolarity modifying agents: In an embodiment, a saline solution (e.g. 0.9% NaCl in water), or a phosphate-buffered saline solution (PBS), or Ringer's (lactate/acetate) solution, or a Tris-HCl buffer is combined with the citric acid to form the diluent. The above solutions, saline, PBS, Ringer's (lactate/acetate) solution and Tric-HCl buffer are commercial items. The diluent (2) thus comprises, preferably consists of, the above solutions and citric acid.

In embodiments, ionic strength and/or isotonicity and/or osmolarity adjusting agents, such as alkali salts (e.g. NaCl, KCl, NaHCO3) are included.

Rheology modifyinging agents: In embodiments, viscosity modifying agents and/or rheology modifying agents, such as monosaccarides (e.g. dextrose), polysaccharides (e.g. guar gum, alginate), and/or glycols (e.g. propane-1,2-diol, glycerol), are included.

pH Modifying agents: In embodiments, pH modifiers such as inorganic acids, inorganic bases or buffers (e.g. HCl, NaOH, phosphate buffer), are included.

As discussed above, one or more of the above classes of additives may be present. However, it is also within the scope of this invention to provide diluents free of additives. In an embodiment, no additives are added. The diluent (2) thus consists of water, e.g. ultrapure water, and citric acid.

In an embodiment, the topical formulation is free of penetration enhancers.

In an embodiment, the topical formulation is free of pharmaceutically active ingredients.

Topical dosage form: The suspension as described herein is typically adapted for topical application on a mammalian, particularly a human being, in need thereof. Thus, the invention provides for a suspension as a topical dosage form. The skilled person is familiar with preparing such dosage forms, e.g. by selecting components complying with pharmaceutical application, by adjusting viscosities and concentration of the constituents. Thus, the dosage form is adapted to physiological conditions, particularly by adjusting pH and osmolarity, as it is conventional in the field.

In embodiments, the concentration of nanoparticles (1) in the topical dosage form is 0.01-100 mg/ml, preferably 0.1-30 mg/mL, particularly preferably 1-5 mg/mL.

In embodiments, the pH of the topical dosage form is 4-9, preferably 6-8, particularly preferably 7-8.

In embodiments, the osmolarity of the topical dosage form is 0-500, preferably 100-400, particularly preferably 250-350 milli-osmoles/kg.

In embodiments, the viscosity of the topical dosage form is 0.2-10000, preferably 0.5-5000, particularly preferably 0.8-1000 cP.

In a preferred embodiment, the invention provides a topical dosage form comprising a dispersed phase (1) and a diluent (2), characterized in that the dispersed phase comprising a plurality of oxidic nanoparticles (1), the oxidic nanoparticles having an elemental composition, as measured by AES, comprising: 10-50 wt % Si (when calculated as SiO2), up to 30 wt % Ca and/or Sr (when calculated as Cao and/or SrO), 5-30 wt % Na (when calculated as Na2O), up to 10 wt % P (when calculated as P2O5), up to 10 wt % Zn (when calculated as ZnO), 10-90 wt % Ce (when calculated as CeO2), up to 10 wt % Ag (when calculated as Ag), up to 50 wt % Zr (when calculated as ZrO2), and 0-90 wt % Mn (when calculated as MnO2); and the oxidic nanoparticles (1) having a hydrodynamic diameter of 10-2000 nm as measured by DLS; and the oxidic nanoparticles comprise one or more phase (s), preferably two spatially separated phases (11, 12) wherein the first phase (11) is an amorphous phase (11), predominantly containing oxides of Si, Ca/Sr, Na, P and optionally Zn, as determined by powder XRD; and the second phase is a crystalline phase (12), predominantly containing Ceria and optionally Ag or Zr, as determined by powder XRD; and the diluent (2) comprising: water, citric acid, and optionally further pharmaceutically acceptable additives, preferably selected from the group consisting of rheology modifying agents, osmolarity modifying agents and pH modifying agents; and whereby the ratio oxidic nanoparticles: citric acid is between 0.1 to 100, preferably 1 to 10 (wt/wt, calculated with anhydrous citric acid).

In a further preferred embodiment, the invention provides a topical dosage form comprising a dispersed phase (1) and a diluent (2), characterized in that the dispersed phase consists of a plurality of oxidic nanoparticles (1), wherein the oxidic nanoparticles consist of bioactive glass; and the oxidic nanoparticles (1) have a hydrodynamic diameter of 10-2000 nm as measured by DLS; and the diluent (2) comprising (2): water, citric acid, and optionally further pharmaceutically acceptable additives, preferably selected from the group consisting of rheology modifying agents, osmolarity modifying agents and pH modifying agents; and whereby the ratio oxidic nanoparticles: citric acid is between 0.1 to 100, preferably 1 to 10 (wt/wt, calculated with anhydrous citric acid). In this embodiment, the bioglas preferably complies with one of the following elemental compositions, as measured by AES: Silica, 20-60 wt %; calcium oxide, 10-50 wt %, but no strontium oxide; sodium oxide, 5-50 wt %; phosphorus oxide, up to 20 wt %; OR Silica, 20-60 wt %; a combination of calcium oxide and strontium oxide, 10-50 wt %; sodium oxide, 5-50 wt %; phosphorus oxide, up to 20 wt %; OR Silica, 20-60wt %; strontium oxide, 10-50 wt %, but no calcium oxide; sodium oxide, 5-50 wt %; phosphor oxide, up to 20 wt %.

In a second aspect, the invention relates to a process for manufacturing a suspension, particularly a topical dosage form, as described herein. This method comprises the step of combining nanoparticles as defined herein and a diluent as defined herein. Generally speaking, the inventive suspensions may be prepared according to methods known in the field. Thus, a diluent (2) is prepared and oxidic nanoparticles (1) are prepared, both components (1) and (2) are provided and combined to thereby form a suspension. This aspect shall be explained in further detail:

Diluent (2): Preparation of aqueous compositions comprising citric acid is entirely conventional.

In one embodiment, Citric acid and/or its salt are added to water under stirring, optionally under heating until a clear solution is obtained. The remaining additives are further added to obtain a clear solution. As a polishing step, a filtration step may be included. Alternatively, additives are added after suspending nanoparticles.

In one alternative embodiment, Citric acid and/or its salt are added to a physiological solution, such as Ringer's solution, under stirring, optionally under heating until a clear solution is obtained. Optionally, viscosity modifiers are added. As a purification step, a filtration step may be included.

Nanoparticles (1): Preparation of nanoparticles is known in the field, Flame spray pyrolysis is an advantageous method. Briefly, soluble precursors of Ca, P, Si, Sr, Ce Zn, Zr and Ag are dissolved in a combustible solvent and sprayed through a nozzle. The created droplets are ignited by a flame and the nanoparticles collected downstream after a nucleation process. Suitable precursors include calcium 2-ethylhexanoate, sodium 2-ethylhexanoate, tributyl phosphate, HMDSO, strontium acetylacetonate hydrate, Ce-2-ethylhexanoate, zinc acetylacetonate, Zr acetylacetonate, Zr 2-ethylhexanoate, and silver acetate. Suitable solvents are aromatics and cyclic ethers, preferably THF.

Preparation of suspensions: Nanoparticles and diluent are combined as convenient in the field, e.g by stirring followed by ultra-sonication or related homogenization steps; optionally temperature-controlled. A pre-treatment of the nanoparticles may be applied and further components may be added afterwards.

In a third aspect, the invention relates to surgical applications and/or therapeutic applications and/or first aid treatment of a topical dosage form as described herein, $1^{st}$ aspect of the invention. The inventive suspensions are particularly useful in the treatment of defective soft tissue, including both preventive treatment and curative treatment. This aspect of the invention shall be explained in further detail below:

Preventive treatment: The preventive treatment shall include surgical applications and medical applications, such as prevention of complications in surgery, specifically the prevention of seroma formation after surgery. In more detail:

(i) Prevention of wound infection/wound inflammation: The inventive suspension is topically applied on a non-infected wound. The inventive suspension has antimicrobial and/or anti-inflammatory activity. Application of the inventive suspension on the wound thus prevents infection and/or inflammation of said wound and supports wound healing. In particular, surgical wounds are risk of wound and/or inflammation. at infection Specifically, seroma formation is often associated with wound healing problems, particularly due to wound infection and/or inflammation. The inventive suspension is thus particularly useful for the prevention wound infection/wound inflammation after surgery, specifically for the prevention of wound infection/wound inflammation associated with seroma formation.

(ii) Prevention of seroma: A seroma is a pocket or cavity that is filled with serous fluid that may develop in the body after surgery. In order to prevent seroma formation after surgery, i.e. the accumulation of serous fluids in such a pocket or cavity, the inventive suspension may be injected in or applied around the incision area, covering the injured tissue. It was found such treatment prevents formation of a pocket or cavity and hence prevents accumulation of serous fluids in such a pocket or cavity.

Curative treatment: The curative treatment shall include surgical applications, such as treatment of wounds and related conditions, specifically the treatment of seroma. In more detail:

(iii) Curative treatment of wounds, particularly of wound infection/wound inflammation: The inventive suspension is topically applied on a wound, particularly an infected and/or inflamed wound. As described above, the inventive suspension has antimicrobial and anti-inflammatory activity. Application of the inventive suspension on the wound thus supports curing (healing) of the wound, particularly curing of the wound infection and/or wound inflammation. As described with respect to preventive treatment, the inventive suspension is particularly useful for the curative treatment of wound infection/wound inflammation after surgery, specifically for the curative treatment of wound infection/wound inflammation associated with seroma formation.

(iv) Curative treatment of seroma: In order to cure a pre-existing seroma, the inventive suspension may be injected into the seroma. Without being bound to theory, it is believed that the suspension described herein provides regenerative properties and/or that prevents or reduces the inflow of further fluid into the seroma. Typically, the inventive suspension is injected into a pre-existing seroma after the serous fluid has been removed by drainage.

As discussed above, the topical dosage forms disclosed herein address a significant unmet clinical need due to their unique properties. These unique and unexpected properties are further illustrated by the examples below.

In embodiments, the invention provides a topical dosage form as described herein, for use as therapeutic agent. In embodiments, the invention provides a topical dosage form as described herein for use in surgery. In embodiments, the invention provides a topical dosage form as described herein for use as a first aid treatment.

In embodiments, the invention provides a topical dosage form as described herein, for use in the treatment of defective soft tissue. Further, the invention provides for the use of a suspension as described herein for the manufacture of a medicament for the treatment of defective soft tissue. Still further, the invention also provides for a method of treating defective soft tissue of a mammal in need thereof, particularly a human being in need thereof, the method comprising the step of applying an effective amount of a topical dosage form as described herein to the soft tissue. Soft tissue may be defective due to surgical wounds, ie. wounds that are planned, and accidental wounds, ie. wounds that are not planned.

In embodiments, the invention provides a topical dosage form as described herein for use in the treatment, particularly for use in the prevention, of seroma.

In embodiments, the invention provides a topical dosage form as described herein for use as antimicrobial agent.

In embodiments, the invention provides a topical dosage form as described herein for use as anti-inflammatory agent.

To further illustrate the invention, the following examples are provided. These examples are provided with no intend to limit the scope of the invention. The figures provided further illustrate the invention and the results obtained.

I. Synthesis of Nanoparticles

All particles were produced by liquid-feed flame spray pyrolysis as conventional in the field and described e.g. in WO2005/087660 and WO2011/020204. Briefly, the precursors were dissolved in the respective solvents (2-Ethylhexanoic acid: 2-EHA, Tetrahydrofuran: THE) such the that total metal ion concentration of the solution was 0.4 M. 5 mL/min precursor solution was pumped to a water-cooled spray nozzle and dispersed by 5 L/min O2. The pressure drop at the nozzle tip was approximately 1.5 bar. The precursor aerosol was ignited by premixed CH4/O2 (1.5: 3.2 L/min) flamelets.

Particles were collected on a glass fiber filter mounted approx. 70 cm above the nozzle.

The following particles were prepared:
1 Ceria: 100 wt % cerium (III) 2-ethylhexanoate (49%, in 2-EHA) in THF.
2 Bioglass: 32.65 wt % calcium acetylacetonate, 41.21 wt % sodium 2-ethylhexanoate, 7.06 wt % tributyl phosphate, and 19.07 wt % HMDSO in THF.
3 Bioglass containing 0.1, 0.5 or 2% silver (Ag0.1-BG, Ag0.5-BG and Ag2-BG respectively by the addition of silver acetate to the BG precursor)
4 Bioglass and ceria hybrid particles (BG/ceria): Mixture of equal volumes of Bioglass and ceria precursor as described above.
5 Bioglass and ceria hybrid, matrix substituted with strontium oxide (SrO) and doped with zinc (Zn2-SrBG/ceria): 5.01 wt % calcium acetylacetonate, 13.02 wt % sodium 2-ethylhexanoate, 2.04 wt % tributyl phosphate, 6.10 wt % HMDSO in THF mixed with 3.85 wt % Strontium acetylacetonate hydrate, 68.34 wt % cerium (III) 2-ethylhexanoate (49%, in 2-EHA), 1.64 wt % Zinc acetylacetonate in 2-EHA.

II. Suspension of Nanoparticles

II.1 Immersion into media

The dry nanoparticles in powder form were added into different media at concentrations between 0.01 mg/ml and 50 mg/ml. The media included ultrapure water, saline (0.9% NaCl in water), phosphate-buffered saline (PBS), Ringer's solution, and Tris-HCl buffer. To stabilize the nanoparticles in Ringer's solution, sodium citrate and citric acid were added in concentrations that correspond to the nanoparticle concentration as seen in the following table.

| Buffer | Particle conc. | Citric acid [mM] | Citrate [mM] |
|--------|----------------|------------------|--------------|
| A | 1 mg/ml | 1.5 | 3 |
| B | 5 mg/ml | 7.5 | 7.5 |
| C | 10 mg/ml | 15 | 15 |
| D | 15 mg/ml | 22.5 | 22.5 |
| E | 30 mg/ml | 45 | 45 |

Further, the stability of the nanoparticle #2 in suspension (1 mg/mL) was investigated. As diluent, Ringers colution (comparative) and Ringer's solution+1.5 mM citric acid+3 mM sodium citrate (inventive) were chosen. Results are presented in FIG. 2b and discussed below III.1.

II.2 Homogenization

The nanoparticles were dispersed in the media they were added to by shaking, stirring, sonication in a bath, probe sonication, or other sonication devices such as the Hielscher UP200St equipped with a VialTweeter.

II. 3 Addition of Additives

Additives to change the rheology and shelf-life of the suspended nanoparticles were added. Amongst others, 0.1-5 mol/L mannose solutions and propylene glycol were added in different volume ratios to the suspended nanoparticles.

III. Characterization of Nanoparticle Suspensions

III.1 Nanoparticle Suspension Stability

The hydrodynamic diameter and the polydispersity of the nanoparticle suspensions was analyzed over time by dynamic light measurements conducted with a Zetasizer scattering (DLS) instrument (Nano ZS90, Malvern Instruments).

Figure 2A:
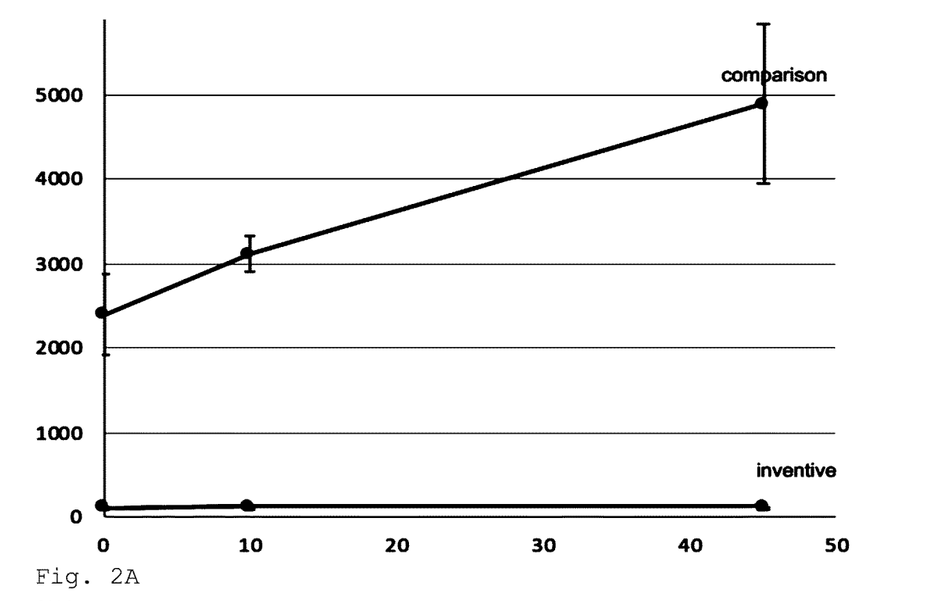
Figure 2B:
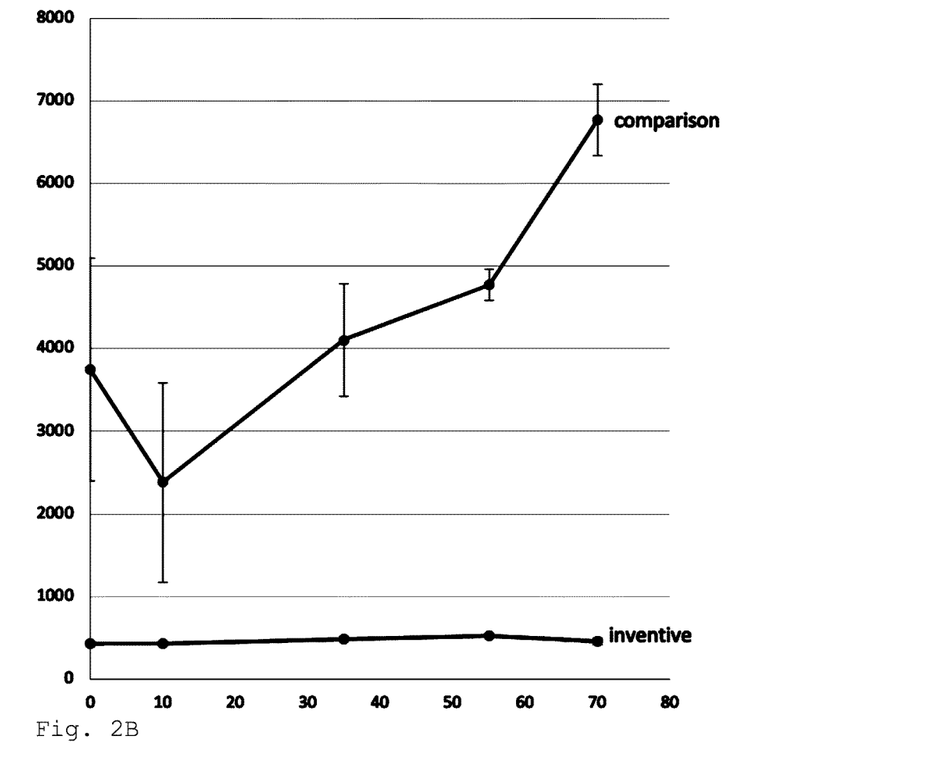

FIG. 2a shows the difference between non-stabilized and stabilized nanoparticles of type #5. Similarly, FIG. 2b shows the difference non-stabilized between and stabilized nanoparticles of type #2. As shown for both particles, particles in non-stabilized settings are already initially present in large agglomerates, they agglomerate even more over time. In a stabilized setting, the nanoparticles are present in small agglomerates and retain this size over a prolonged time. The results are presented in FIG. 3 and discussed below, section IV.

III.2 Nanoparticle Activity

H2O2 reduction is an accepted indicator for the scavenging of reactive oxygen species which translates to anti-inflammatory activity. H2O2 can be quantified by measuring UV absorbance at 235 nm using a H2O2 standard curve. The stabilized and non-stabilized nanoparticle suspensions were incubated at different concentrations with 50 mM H2O2 while shaking at 300 rpm and 37° C. Samples were harvested at different times and the nanoparticles were centrifuged out of suspension at 4° C. and 20000 ×g. Supernatants transferred to a UV-transparent 96-well plate (Greiner, 655801). The particle activity towards the decomposition of H2O2 was measured by quantifying the remaining H2O2 concentration in the samples.

Figure 4:
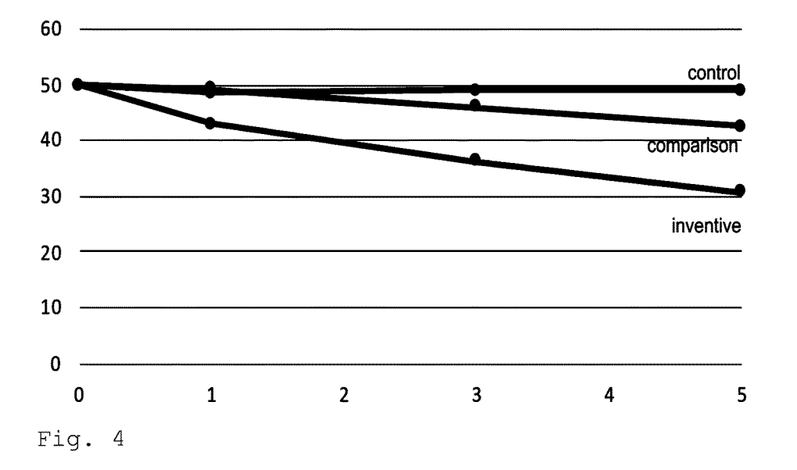

The results are shown in FIG. 4 and discussed below, section IV.

III.3 In Vitro Biological Activity

Bacterial Cultures

Methicillin-resistant *Staphylococcus aureus* (MRSA, DSMZ 11729) was obtained from DSMZ German Collection of Microorganisms and Cell Cultures Gmbh (Braunschweig, Germany). Human monocytic cell line THP-1 from ATCC was used as a precursor for monocyte-derived macrophages. The THP-1 cells were cultured in RPMI-1640 according to the supplier's protocol and used from passage 6 up to 21.

Mammalian Cell Cultures

THP-1 cells were grown in T75 culture flasks (90075, TPP Switzerland) containing RPMI 1640 medium (R7388, Sigma-Aldrich) supplemented with 10% fetal calf serum (FCS, F9665, Sigma Aldrich), 1% L-glutamine (D7513, Sigma Aldrich) and 1% Penicillin Streptomycin Neomycin mix (P4083, Sigma Aldrich) at 37° C. in a humidified atmosphere of 5% CO2. For routine maintenance, THP-1 was subcultured and the medium was refreshed every 3-4 days. The Suspension cells were counted using an automated hemocytometer (Casy TT® cell counter, Roche Innovatis AG). Subcultures were seeded at density 0.5-1×106 per 20 ml fresh medium at 37° C. in a humidified atmosphere of 5% CO2.

To obtain THP-1 derived macrophages, differentiation of monocytes was induced by addition of Phorbol-12-myristate-13-acetate (PMA, 200 nM, P1585, Sigma Aldrich) to monocytes in supplemented RPMI 1640 medium. Cells were seeded at a density of 3×106 per ml (60.000 cells/well, 1900 cells/mm2) in a 96-well plate and cultured for 72 h at 37° C. in a humidified atmosphere of 5% CO2. After incubation, non-attached cells were removed by aspiration and adherent monocyte-derived macrophage cells were washed three times with pre-warmed RPMI 1640 to remove PMA.

Cell Viability Experiments

THP-1 derived macrophages seeded at a density of 1900 cells/mm2 in a 96-well plate were treated with nanoparticles at different concentrations: 0.1, 0.5 mg/ml and 1 mg/ml for 24 h, 37° C. in a humidified atmosphere of 5% CO2. Subsequently, the supernatant was collected and nanoparticles were removed by centrifugation at 5000×g for 15 min at room temperature (RT). Mitochondrial ATP was measured by adding Celltiter Glo (G7570, Promega) reagent in a 1:1 ratio (50 µl) to the treated macrophages for 10 min on a shaker in dark at RT. Luminescence was then recorded using the Mithras-2 LB943 Multimode Reader. For both assays, nanoparticle interference was measured using the same experimental procedure in the absence of macrophages (cell-free control).

Figure 5:
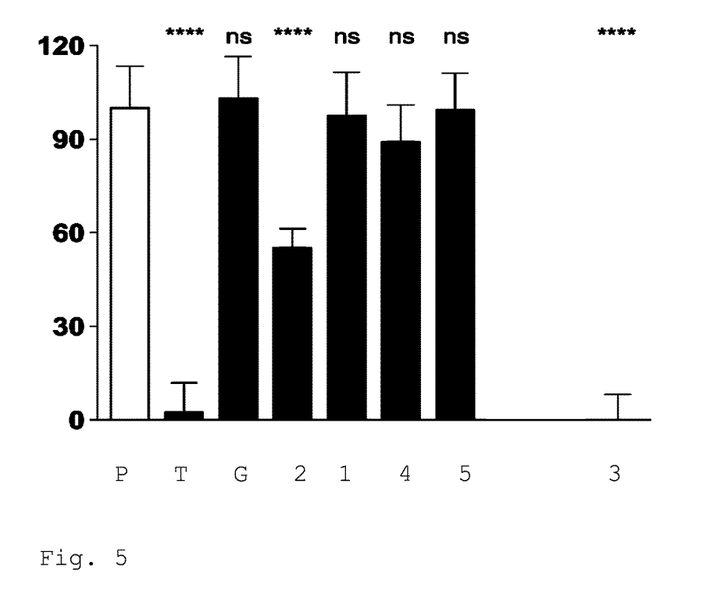
FIG. 5: shows macrophage viability after 2.5h treatment (0.5 mg/ml NPs, 100 µg/ml gentamicin) quantified by ATP generation, c.f. ex. III.4.
y-axis: macrophage viability
From left to right: PBS-TritonX-Gentamicin-#2-#1-#4-#5-#3.

The results are shown in FIG. 5, where Macrophage viability after 2.5 h treatment (0.5 mg/ml NPs, 100 µg/ml gentamicin) is quantified by ATP generation, and discussed below in section IV.

Antimicrobial Effect of Nanoparticles on Planktonic Bacteria

MRSA DMSZ 11729 was grown overnight in Tryptic soy broth (TSB100) at 37° C. on a shaker at 160 rpm. Bacteria were then transferred onto a TSB agar plate to form colonies overnight at 37° C., 5% CO2. For each experiment, one colony was inoculated in TSB100 and grown overnight. Then, bacteria were diluted to an optical density (OD) of 0.1 and grown for 1-1.5 h, to reassure that the bacteria were in log phase. After reaching log phase (around OD600=0.6), the culture was diluted to OD600=0.1 again and added to a 96-well plate (TPP, Sigma Aldrich) with nanoparticles in a 1:4 ratio to obtain final nanoparticle concentrations of 0.5 mg/ml. The particles and bacteria were incubated for 2.5 hours before quantifying bacterial numbers.

CFU Counting

The samples containing MRSA were diluted in PBS to concentration of around 1×103 CFU/ml and 100 µl was plated on LB agar plates (Plate count agar, 70152, Sigma Aldrich). After 18-20 h incubation at 37° C., CFU were quantified with a SCAN® 300 instrument (Interscience, France) using the SCAN® software.

Figure 6:
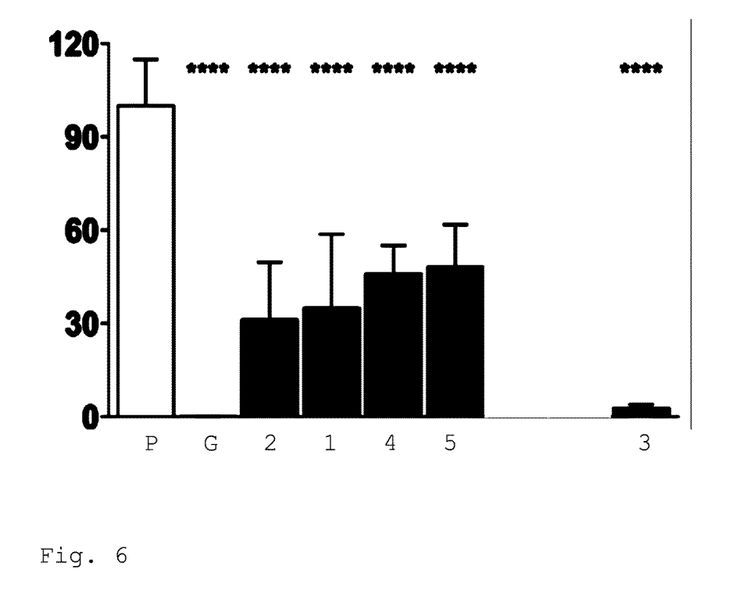
FIG. 6: activity of the nanoparticles against MRSA as assessed by CFU counting () Control PBS was set as 0% inhibition and 100% growth.
y-axis: MRSA growth %
From left to right: PBS Gentamicin-#2-#1-#4-#5-#3.

The results are summarized in FIG. 6 where the activity of the various nanoparticles against MRSA is assessed by CFU counting. Control PBS was set as 0% inhibition and 100 growth.

Antimicrobial Effect of Nanoparticles on Internalized Bacteria

THP-1 derived macrophages were obtained as described above. Macrophages were incubated with RPMI 1640 without PMA for 22 h in a 96-well plate. After this period, the medium was replaced with antibiotic-free RPMI without phenol red, supplemented with 10% FCS. Cells were infected with MRSA (DSMZ 11729) at a multiplicity of infection (MOI) of 10 for 1 h at 37°C., 5% CO2. Then, wells were washed three times with cold PBS (4° C.) and incubated with 100 µg/ml gentamicin in RPMI 1640 for 1 h at 37° C., 5% CO2 to eliminate extracellular bacteria in line with available protocols. 67 The gentamicin-containing medium was then removed and all wells were rinsed three times with cold PBS and filled with 150 µl RPMI 1640 medium supplemented with 10% FCS and 0.5 mg/ml BG, Ceria, Zn2-SrBG/ceria, BG/Ceria, Ag0.1-BG, Ag0. 5-BG, or Ag2-BG and subsequently incubated for 2.5 h at 37° C., 5% CO2.

In order to assess the cytotoxicity of the nanoparticles, the release of LDH into the supernatant was measured using Cytotox 96 non-radioactive Cytotoxicity assay as described above. Triton X-100 (1%) in RPMI was used as a negative control and PBS in RPMI as a positive control.

Figure 7A:
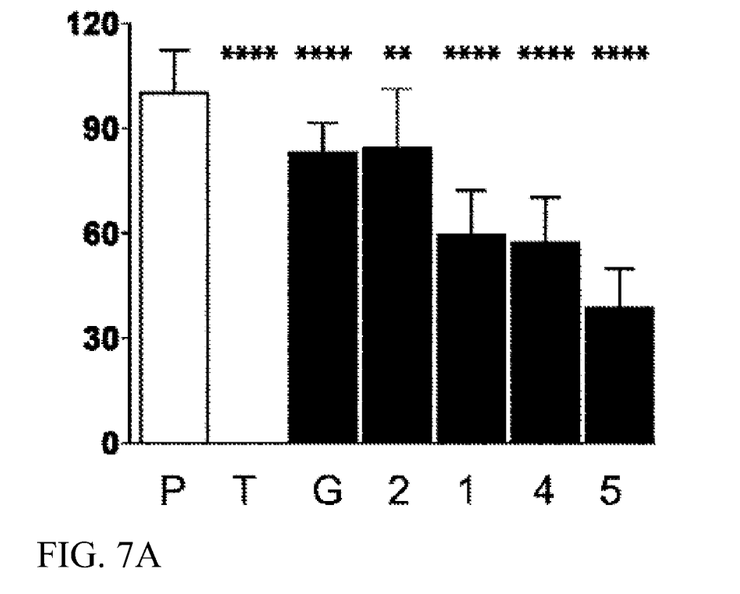
-Fig. 7A-FIG. 7D show that the nanoparticles are able to decrease intracellular bacteria numbers without damaging the mammalian cells. Gentamicin dose: 100 µg/ml; NP dose: 500 µg/ml.
Figure 7B:
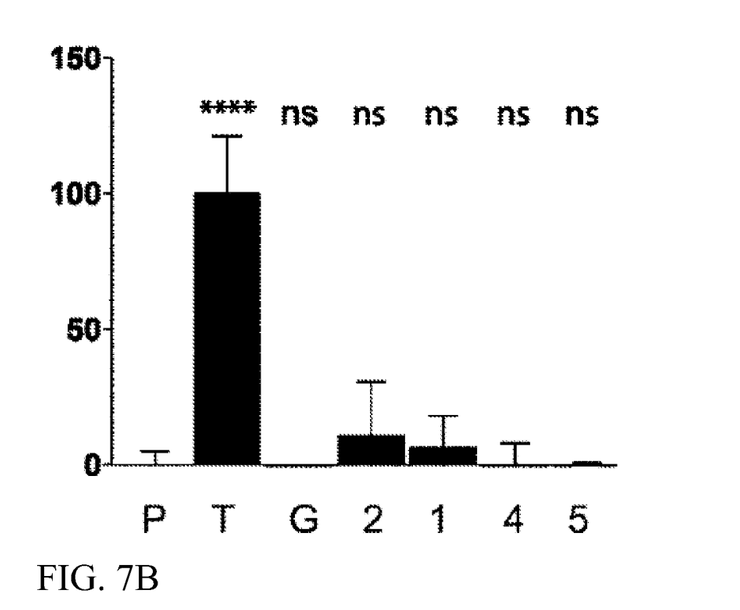

After incubation with nanoparticles or control conditions (PBS and Triton X-100), cells were washed three times with cold PBS and macrophage cell walls were subsequently perforated with 0.1% saponin (47036, Sigma Aldrich) for 10 min at RT on a shaker to release internalized bacteria. The suspension containing the released bacteria (0.1 ml) L) was then 10-1000× diluted in 0.9% NaCl, plated in triplicates on a PC agar plate for 18-20 h at 37° C. and CFUs were counted as described before. For reference, CFU of the supernatants prior to saponin treatment were measured to account for potentially present extracellular bacteria. The results are summarized in FIG. 7A and FIG. 7B and discussed in section IV.

Inhibition of Nanoparticle Endocytosis

THP-1 derived macrophages were infected with bacteria at an MOI of 10 for 1 h as described above. After washing the macrophages three times with PBS, one group was treated with 20 µM Cytochalasin-D (cytoD) 68 to block endocytosis of nanoparticles as well as 100 µg/ml gentamicin to kill extracellular bacteria during 1 h at 37° C., 5% CO2. The control group was incubated with 100 µg/ml gentamicin in absence of cytoD. After washing twice, RPMI+10% FCS was added to the unblocked control and 10 µM cytoD in RPMI+10% FCS was added to the inhibited group. Then 0.5 mg/ml Zn2-SrBG/ceria nanoparticles, 100 µg/ml gentamicin or an equal volume of PBS were added to both groups and left to incubate for 2.5 h at 37° C., 5% CO2. After the incubation time, the supernatants were collected and LDH was measured following the aforementioned protocol. Then, samples were washed twice with RPMI+10% FCS and 100 µg/ml gentamicin to remove potentially present extracellular bacteria and finally washed twice with PBS. Subsequently, all cells were permeabilized with 0.1% saponin for 10 min. Each sample was diluted 10-1000× and plated on PC-agar plates for CFU quantification.

Figure 7C:
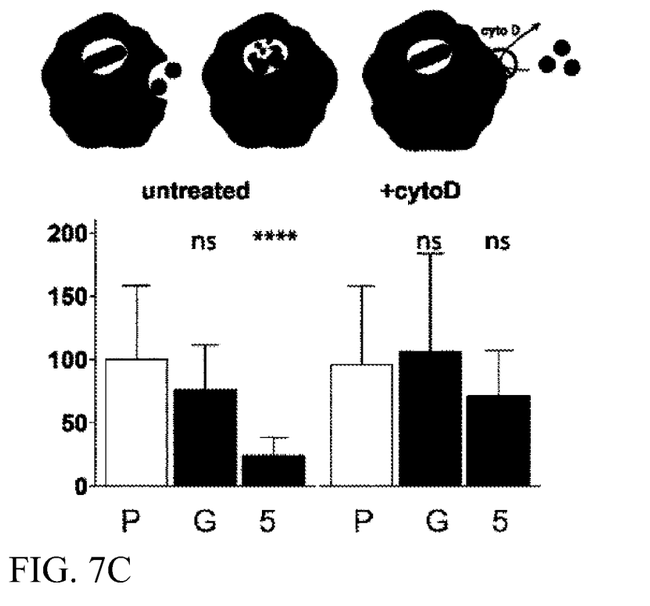
Figure 7D:
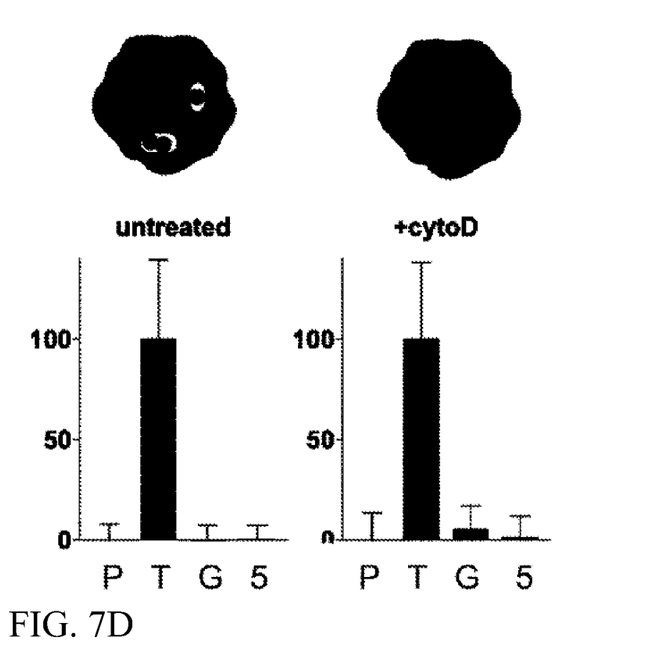

The results are summarized in FIGS. 7C and D and discussed below.

III. 4 In Vivo Biological Activity

Figure 8A:
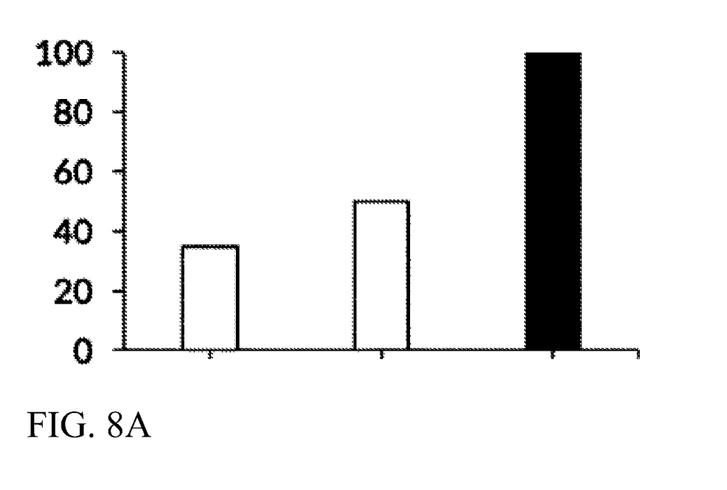
Figure 8B:
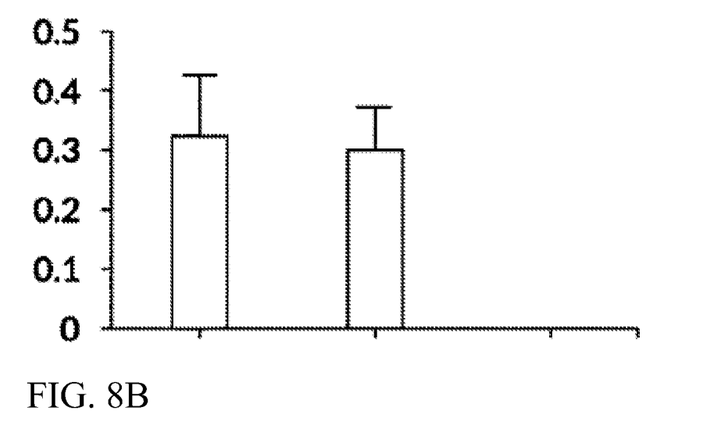

To assess the medical potential of the nanoparticles, a seroma treatment study in rats was performed, c.f. FIG. 8. On day 0, seromas were induced in both axillae of 20 rats. On day 7, all rats had a seroma on the left and another one on the right side. Both sides were aspirated using a needle. On the right side of 10 rats, fibrin sealant was injected into the emptied seroma cavity (comparative). On the right side of the other 10 rats, a suspension of particle #5 was injected (inventive). After another 7 days, so on day 14, the seroma occurrence and volume was assessed.

IV Conclusion

Figure 3:
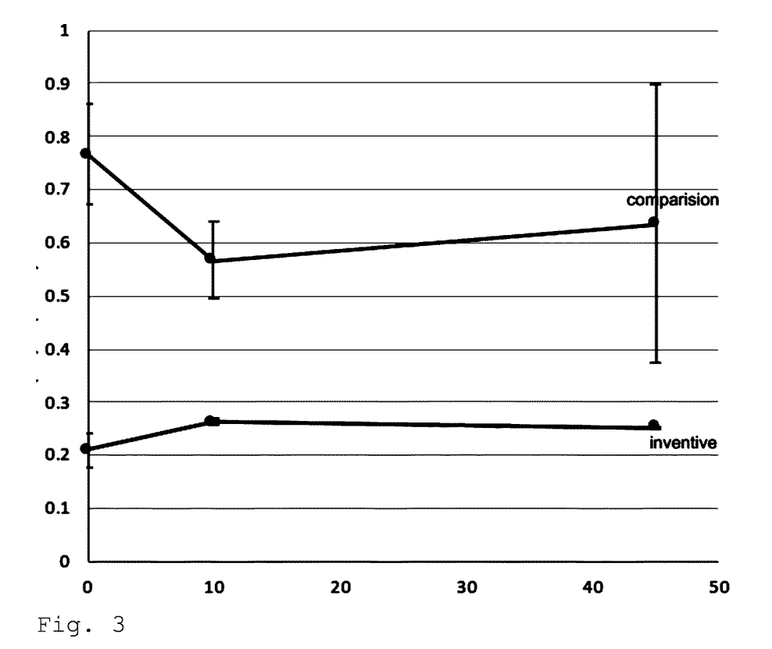

The above experimental data clearly show (a) the beneficial properties of the topical dosage form where the dispersed phase is an aqueous phase comprising citric acid (c.f. FIGS. 2-4) and (b) the beneficial properties of the nanoparticles in surgical applications (FIGS. 5-8). The key findings are summarized as follows.
- FIG. 1A exemplifies different compositions of the nanoparticles. For the biological testing, the composition entitled "Zn2-SrBG/ceria, #5" was chosen.
- FIG. 1B illustrates the different structures that LF-FSP gives access to. Just as the nanoparticle composition, the nanoparticle architecture can be tailored to the planned application. For biological testing, a mixed-oxide phase (iii) was chosen.
- FIGS. 2A and B show the difference between non-stabilized nanoparticles (aqueous compositions free of citric acid) and stabilized nanoparticles (aqueous compositions comprising citric acid). While non-stabilized are already initially present in large agglomerates, they agglomerate even more over time. In a stabilized composition, the nanoparticles are present in small agglomerates over a long time span.
- FIG. 3 demonstrates that the nanoparticulate compositions comprising citric acid additionally have a more uniform size distribution, whereas the nanoparticulate compositions free of citric acid are present in a larger variety of different sizes.
- FIG. 4: $H_2O_2$ reduction is an accepted indicator for the scavenging of reactive oxygen species which translates to anti-inflammatory activity. The data of FIG. 4 indicate that (1) the stabilization of these active nanoparticles by citric acid leads to an increase in activity and (2) the suitability of the inventive compositions mitigate inflammation which is of crucial importance in a wound environment. The data show a significantly improved neutralization of $H_2O_2$ of the inventive suspension, thereby indicating improved anti-inflammatory properties.
- FIG. 5: As can be seen, BG #2 and Ag #3 compromise macrophage viability while particles of type #5 are well tolerated.
- FIG. 6 shows that particle #5 features a strong antimicrobial activity while also being cytocompatible as illustrated in FIG. 5.
- FIG. 7A and B: The data show that the nanoparticles are able to decrease intracellular bacteria numbers without damaging the mammalian cells. Gentamicin dose: 100 µg/ml; NP dose: 500 µg/ml. Especially particle #5 shows a strong antibacterial activity while being cytocompatible.
- FIG. 7C shows inhibition of the nanoparticle internalization by blocking of the actin polymerization with cytoD leads to suppression of the antimicrobial activity. FIG. 7D illustrates that no macrophage toxicity was observed for any of the treatments (in absence of MRSA). Control PBS was set as 100% growth and 0% toxicity. Significance levels compared to PBS are shown, $p<0.0001$. N=3.
- As FIG. 8A demonstrates, the seromas that were treated using the nanoparticles had a 100% healing rate, whereas the fibrin sealant only helped 50% to heal. Utilizing only aspiration, which is the current standard of care, around 30% of the seromas healed. This also translates to seroma volume as shown in FIG. 8B: the nanoparticle treated rats had no seroma volume at all while the other two groups showed similar volumes on average.

The invention claimed is:

1. A topical dosage form comprising a dispersed phase and a diluent, wherein the dispersed phase comprises a plurality of oxidic nanoparticles, the oxidic nanoparticles having an elemental composition, as measured by atomic emission spectroscopy (AES), comprising:
   10-50 wt % Si, when calculated as $SiO_2$,
   0-30 wt % Ca and/or Sr, when calculated as CaO and/or SrO,
   5-30 wt % Na, when calculated as $Na_2O$,
   0-10 wt % P, when calculated as $P_2O_5$,
   0-10 wt % Zn, when calculated as ZnO,
   10-90 wt % Ce, when calculated as $CeO_2$,
   0-10 wt % Ag when calculated as Ag,
   0-50 wt % Zr; when calculated as $ZrO_2$, and
   0-90 wt % Mn, when calculated as $MnO_2$;
   wherein the oxidic nanoparticles have a hydrodynamic diameter of 10-2000 nm as measured by dynamic light scattering (DLS);

wherein the oxidic nanoparticles comprise a first phase and a second phase, the first phase and the second phase being spatially separated, wherein the first phase is an amorphous phase, predominantly containing oxides of Si, optionally Ca and/or SR, Na, P and Zn, as determined by powder X-Ray diffraction analysis (XRD); and the second phase is a crystalline phase, predominantly containing Ceria and optionally Ag or Zr, as determined by powder XRD; and wherein the diluent comprises:

water, citric acid, and optionally further pharmaceutically acceptable additives; and wherein a ratio of the oxidic nanoparticles: citric acid is from 0.1 to 100 wt/wt.

2. The topical dosage form of claim 1, wherein the first phase and the second phase form nanoparticles selected from the group consisting of core-shell nanoparticles, janus nanoparticles, mixed phase nanoparticles, phase-segregated nanoparticles, and mixtures thereof.

3. The topical dosage form of claim 1, wherein the first phase is an amorphous phase, predominantly containing oxides of Si, Ca and/or Sr, Na, P and Zn, as determined by powder XRD; and the second phase is a crystalline phase, predominantly containing Ceria and Ag, as determined by powder XRD.

4. The topical dosage form according to claim 1, wherein said first phase is a bioactive glass, comprising (a-1) 20-60 wt % Silica, when calculated as $SiO_2$, (a-2) 10-50 wt % Ca, but no Sr, when calculated as calcium oxide, (a-3) 5-50 wt % Na, when calculated as sodium oxide, and (a-4) 0-20 wt % P, when calculated as phosphorus oxide; or (b-1) 20-60 wt % Silica, when calculated as $SiO_2$, (b-2) 10-50 wt % of a combination of Ca and Sr, when calculated as calcium oxide and strontium oxide, (b-3) 5-50 wt % Na, when calculated as sodium oxide, and (b-4) 0-20 wt % P, when calculated as phosphorus oxide; or (c-1) 20-60 wt % Silica, when calculated as $SiO_2$, (c-2) strontium oxide, 10-50 wt %, but no calcium oxide, (c-3) 5-50 wt % Na, when calculated as sodium oxide, and (c-4) 0-20 wt % P, when calculated as phosphorus oxide; and wherein the first phase further optionally comprises a dopant selected from the group consisting of Ag, Cu, Ga, Co, Zn, and combinations thereof.

5. The topical dosage form according to claim 1, wherein said second phase is a ceria selected from compounds of formula (I)

$$CeO_{2-x} \qquad (I)$$

wherein x is between 0 and 0.67; and wherein up to 10 wt % of Ce may be replaced by a dopant selected from the group consisting of Zr, Zn, Cu, Ag, Ga, and combinations thereof.

6. The topical dosage form according to claim 2, wherein said oxidic nanoparticles comprise a mixture of mixed-phase nanoparticles and phase-segregated nanoparticles, and said oxidic nanoparticles have an elemental composition, as measured by AES:

15-25 wt % Si, when calculated as $SiO_2$, 5-10 wt % Ca when calculated as CaO, 5-10 wt % Sr, when calculated as SrO, 10-15 wt % Na, when calculated as $Na_2O$, 1.5-3 wt % P, when calculated as $P_2O_5$, 1-3 wt % Zn, when calculated as ZnO, and 45-55 wt % Ce, when calculated as $CeO_2$.

7. The topical dosage form according to claim 1, wherein a combination of citric acid and its sodium salt are present at a molar ratio of 1:10 to 10:1 in the topical dosage form.

8. The topical dosage form according to claim 1, wherein the diluent comprises the pharmaceutically additives selected to obtain a physiological composition.

9. The topical dosage form according to claim 1, wherein the dosage form complies with one or more of the following (a)-(d):

(a) concentration of the oxidic nanoparticle in the topical dosage form is 0.01-100 mg/ml;

(b) the pH is 4-9;

(c) osmolality is 0-500 milli-osmoles/kg; and (d) viscosity is 0.2-10000 cP.

10. A method of manufacturing the topical dosage form according to claim 1, comprising a step of combining oxidic nanoparticles and a diluent, optionally with ultra-sonication, wherein the oxidic nanoparticles having an elemental composition, as measured by Auger electron spectroscopy (AES), comprising:

10-50 wt % Si, when calculated as $SiO_2$, 0-30 wt % Ca and/or Sr, when calculated as CaO and/or SrO, 5-30 wt % Na, when calculated as $Na_2O$ 0-10 wt % P, when calculated as $P_2O_5$, 0-10 wt % Zn, when calculated as ZnO, 10-90 wt % Ce, when calculated as $CeO_2$, 0-10 wt % Ag when calculated as Ag, 0-50 wt % Zr; when calculated as $ZrO_2$, and 0-90 wt % Mn, when calculated as $MnO_2$;

wherein the oxidic nanoparticles have a hydrodynamic diameter of 10-2000 nm as measured by dynamic light scattering (DLS);

wherein the oxidic nanoparticles comprise a first phase and a second phase, the first phase and the second phase being spatially separated, wherein the first phase is an amorphous phase predominantly containing oxides of Si, optionally Ca/Sr Ca and/or Sr, Na, P and Zn, as determined by powder X-Ray diffraction analysis (XRD); and the second phase is a crystalline phase, predominantly containing Ceria and optionally Ag or Zr, as determined by powder XRD, wherein the diluent comprises: water, citric acid, and optionally further pharmaceutically acceptable additives; and wherein a ratio of the oxidic nanoparticles: citric acid is between 0.1 to 100 wt/wt.

11. The topical dosage form according to claim 1, for use as a therapeutic agent and/or for use in surgery and/or for use as a first aid treatment.

12. A method for therapeutic treatment of a defective soft tissue of a subject, comprising administering the topical dosage form according to claim 1 to the defective soft tissue.

13. The method of claim 12, wherein the defective soft tissue is a wound.

14. The method of claim 12, wherein the administration of the topical dosage form treats seroma.

15. A method for treating therapeutic treatment of an infection and/or inflammation of a subject, comprising administering the topical dosage form of claim 1 to the subject.

16. The method of claim 13, wherein the wound comprises surgical wounds, accidental wounds, or a combination thereof.

* * * * *